July 31, 1956      K. KRAUS ET AL      2,756,789
ADJUSTABLE INTERCONNECTED MULTIPLE CLAMPING DEVICE
Filed April 29, 1954
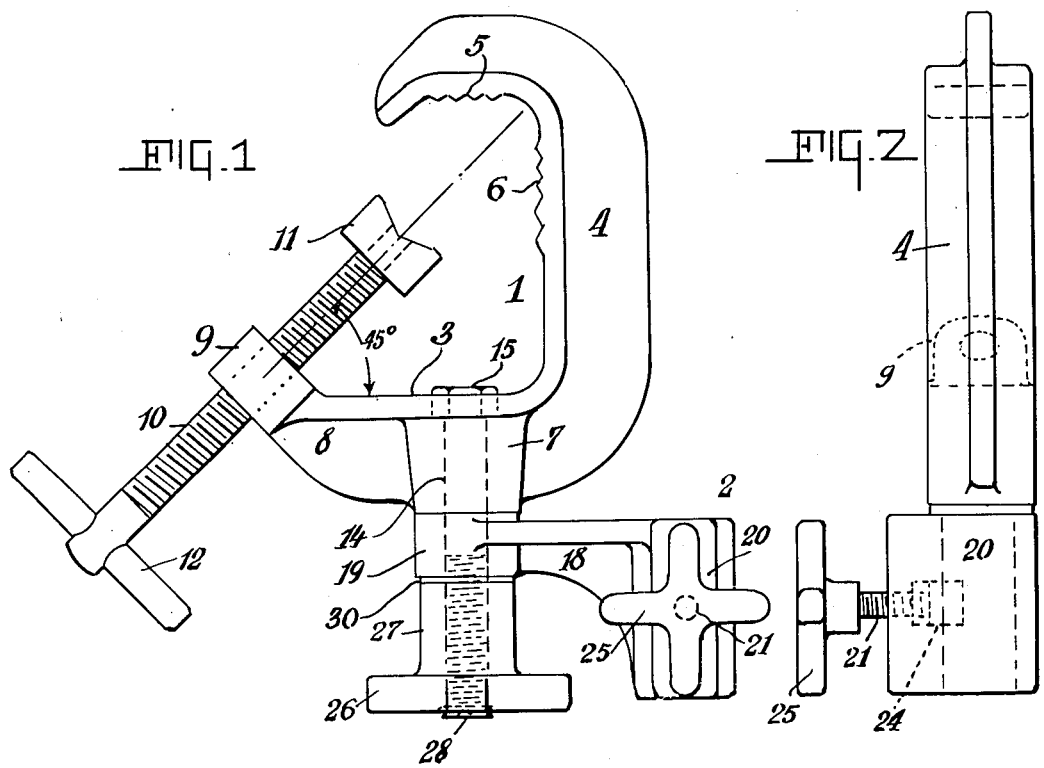
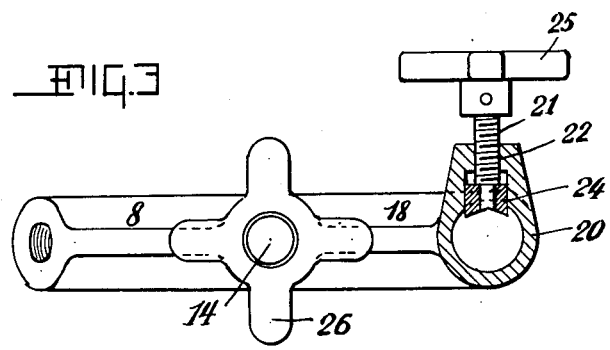
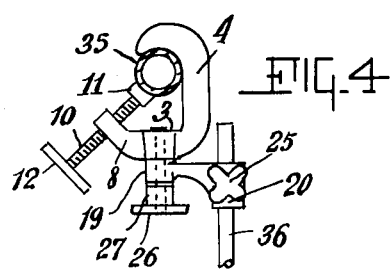
KERMIT KRAUS
MARTIN KRAUS
INVENTORS

2,756,789
ADJUSTABLE INTERCONNECTED MULTIPLE CLAMPING DEVICE

Kermit Kraus, Larchmont, and Martin Kraus, White Plains, N. Y.

Application April 29, 1954, Serial No. 426,483

1 Claim. (Cl. 144—304)

This invention relates to clamping devices and the object of the invention is to provide a clamping device for use in clamping two objects together which may occupy two different planes angularly inclined and irrespective of the spacing between two objects so long as they lie within the reach of the device. The invention is embodied in a clamping device comprising a main clamping mechanism to be clamped to a first object, a pipe for example, and an auxiliary clamping mechanism for securing a second object, another pipe for example, to the first object. The invention is disclosed as a means for clamping two pipes together by way of example only. A clamping device according to the invention may be used in many different places and upon many different objects for different purposes.

With the foregoing and other ancillary objects in view the invention is embodied in a clamping device as hereinafter described and claimed and as illustrated in the accompanying drawing in which—

Fig. 1 is a side view of the clamping device.

Fig. 2 is a view looking from the right in Fig. 1.

Fig. 3 is a bottom view.

Fig. 4 is a diagrammatic illustration of one use of the device.

The clamping device according to this invention comprises two clamp mechanisms, a main clamping mechanism 1 and an auxiliary clamping mechanism 2. The main mechanism consists of a rigid bracket forming a base 3 and a right angled fixed upright jaw 4 having inner jaw surfaces 5 and 6. The base 3 forms a boss 7 and has an arm 8 extending in a direction opposite to and in the same plane as the fixed jaw 4. The arm 8 ends in a threaded boss 9 and through the latter passes a threaded swivel screw 10 having a swivel clamping head 11. The other end of the screw carries a handle 12. The axis of the screw 10 is inclined at an angle of forty five degrees towards the fixed jaw 4 and the axis of the screw points towards the two jaws 5 and 6 for clamping action thereagainst.

An object, such as a pipe for example, may be clamped between the swivel head 11 and the jaws 5 and 6 by manipulation of the handle 12.

The base boss 7 carries a bolt 14. The hexagonal head 15 of the bolt is countersunk in the base as shown so that the bolt can not rotate. Below the boss 7 the auxiliary clamping mechanism 2 is swingably supported on the bolt 14. The auxiliary mechanism is in the form of an arm 18 having a boss 19 at the one end of the arm to receive the bolt 14. The other end of the arm ends in a clamping head 20.

The clamping head 20 is a sleeve into which extends a threaded stud 21 through a threaded hole 22. The stud carries a clamping key 24 within the sleeve and is operable by a hand knob 25.

The auxiliary clamping mechanism 2 may be clamped and thereby secured in any position around and upon the bolt 14 by means of a hand knob 26 having a relatively long bearing 27 which is screwed upon the bolt 14. The end of the bolt may be peened as at 28 to prevent the hand knob from separation from the bolt.

One use of the disclosed clamping device is illustrated in Fig. 4 where two pipes 35 and 36 are clamped together. The main clamping mechanism 1 may be hooked over a pipe 35 and clamped thereto. Then a second pipe 36 may be inserted in the clamping sleeve or head 20 and clamped therein between the clamping key 24 and the opposite wall of the sleeve. Or a pipe 36 may be clamped first in the auxiliary clamping mechanism and thereafter the main clamping mechanism may be moved along another pipe 35 until a given location is reached where the main mechanism 1 will be clamped to the pipe 35.

The device disclosed herein serves the purpose of clamping two objects together in desired adjusted relation. The device may be clamped first to either one of the objects. It is within the intent and the scope of this disclosure to provide a relatively long auxiliary arm 18 so that the spacing between the two objects 35 and 36 need not be restricted to that shown in the drawing. We therefore claim all such changes and modifications of the disclosed invention as may fall within the principle and the scope of the appended claim.

We claim:

A clamping device comprising in combination a main clamping mechanism and an auxiliary clamping mechanism, said main mechanism consisting of a clamping member forming a base, an upright rigid jaw member arising from one end of said base and terminating at its upper free end in angularly inclined clamping faces, an arm extending from the other end of said base in the plane of said upright member, a clamping swivel screw threadedly engaging said arm and passing therethrough in a direction at an angle to and opposite said upright jaw member and clamping faces for cooperative clamping action with said faces, a bolt in said base intermediate said upright member and said arm, the axis of said bolt being in the same plane as the axis of said clamping swivel screw, said bolt extending outwardly below and away from said base, means preventing rotation of the bolt in the base, a second arm integral with said auxiliary clamping mechanism, a bearing on one end of said second arm rotatably supported on the said bolt below the said base, auxiliary clamping members supported on the other free end of said second arm consisting of a sleeve having an axis parallel to that of the bolt, said sleeve being integral with said second arm and a clamping stud movable in said sleeve to clamp an object therein and a hand knob below said second arm threadedly engaging the said bolt for securing said auxiliary clamping mechanism thereon and to the main clamping mechanism in rotatable adjusted position on said bolt the axes of the said clamping swivel screw and of the said bolt intersecting one another at an angle of substantially forty five degrees.

References Cited in the file of this patent

UNITED STATES PATENTS

| | | |
|---|---|---|
| 1,263,560 | Kaufmann | Apr. 23, 1918 |
| 1,486,158 | Price | Mar. 11, 1924 |
| 1,754,929 | Atticks et al. | Apr. 15, 1930 |
| 2,116,474 | Bondeson | May 3, 1938 |